(12) United States Patent
Sun et al.

(10) Patent No.: US 11,293,938 B2
(45) Date of Patent: Apr. 5, 2022

(54) THERMAL CONVECTION BASED ACCELEROMETER AND HEATING CONTROL METHOD THEREFOR

(71) Applicant: MEMSIC Semiconductor (TIANJIN) Co., Ltd., Tianjin (CN)

(72) Inventors: Hongzhi Sun, Naperville, IL (US); Alexander Dribinsky, Naperville, IL (US)

(73) Assignee: MEMSIC Semiconductor (TIANJIN) CO., LTD., Tianjin (CN)

(*) Notice: Subject to any disclaimer, the term of this patent is extended or adjusted under 35 U.S.C. 154(b) by 0 days.

(21) Appl. No.: 17/080,867

(22) Filed: Oct. 27, 2020

(65) Prior Publication Data

US 2021/0123942 A1    Apr. 29, 2021

(30) Foreign Application Priority Data

Oct. 29, 2019   (CN) .......................... 201911038249.0

(51) Int. Cl.
  *G01P 15/00* (2006.01)
  *H05B 1/02* (2006.01)
(52) U.S. Cl.
  CPC ............ *G01P 15/00* (2013.01); *H05B 1/0297* (2013.01)
(58) Field of Classification Search
  CPC .............................. G01P 15/00; H05B 1/0297
  See application file for complete search history.

(56) References Cited

U.S. PATENT DOCUMENTS

| 6,795,752 | B1* | 9/2004 | Zhao | G01P 15/008 |
| | | | | 700/299 |
| 7,392,703 | B2* | 7/2008 | Zhao | G01P 15/18 |
| | | | | 73/514.05 |
| 7,856,879 | B2* | 12/2010 | Cai | G01P 15/008 |
| | | | | 73/514.09 |

FOREIGN PATENT DOCUMENTS

RU          2528119 C2 *  9/2014

* cited by examiner

*Primary Examiner* — Natalie Huls
*Assistant Examiner* — Cynthia L. Davis
(74) *Attorney, Agent, or Firm* — EcoTech Law Group, P.C.

(57) ABSTRACT

Thermal convection based accelerometers and heating control methods therefor are described. The heating control method includes: sensing a temperature in the enclosed cavity and generating a temperature voltage signal; amplifying the temperature voltage signal to obtain an amplified temperature voltage signal; calculating a voltage difference between the amplified temperature voltage signal and a reference voltage signal; converting the voltage difference into a digital sequence by using a modulator; obtaining a heating power adjustment factor representing the voltage difference based on the digital sequence; obtaining a heating power control parameter based on the heating power adjustment factor and an initial heating power factor; converting the heating power control parameter into a switch control signal; and turning on or off a heating control switch coupling with a heating resistor for heating the enclosed cavity in series according to the switch control signal.

11 Claims, 2 Drawing Sheets

THERMAL CONVECTION BASED ACCELEROMETER AND HEATING CONTROL METHOD THEREFOR

RELATED APPLICATION

This application claims the priority from CN Application having serial number 201911038249.0, filed on Oct. 29, 2019, which are incorporated herein by reference for all purposes.

FIELD OF THE INVENTION

The present invention relates to the field of thermal convection based accelerometer, and in particular to a thermal convection based accelerometer having a rapidly stabilized closed-loop heating control circuit and a heating control method for the thermal convection based.

BACKGROUND TECHNIQUE

A thermal convection based accelerometer is implemented based on heating gas in an enclosed cavity therein and sensing temperatures by thermocouples in different positions of the enclosed cavity. In order to obtain stable sensitivity, the temperature of the gas in the enclosed cavity must be precisely controlled. The conventional solution is implemented by using an integrator in a loop of a heating control circuit to make a bandwidth of the loop of the heating control circuit smaller than any pole brought by the accelerometer. A disadvantage of the conventional solution is that the temperature stabilization speed is slow, which causes that a large amount of time and power consumption are required to stabilize the temperature of the closed cavity before the accelerometer starts measuring in an on-demand mode, thereby resulting in an excessively low data rate.

Therefore, it is necessary to provide an improved solution to resolve the foregoing problem.

SUMMARY OF THE INVENTION

This section is for the purpose of summarizing some aspects of the present invention and to briefly introduce some preferred embodiments. Simplifications or omissions in this section as well as in the abstract may be made to avoid obscuring the purpose of this section and the abstract. Such simplifications or omissions are not intended to limit the scope of the present invention.

The present invention generally pertains to a thermal convection-based accelerometer and a heating control method therefor, which can significantly improve stabilization speed of a closed-loop heating control circuit while avoiding a significant increase in chip area and power consumption.

According to one aspect of the present invention, a thermal convection based accelerometer is provided. The thermal convection based accelerometer comprises a body having an enclosed cavity; and a heating control circuit configured for controllably heating the enclosed cavity. The heating control circuit comprises: a heating resistor configured for heating the enclosed cavity; a heating control switch configured for powering on or off the heating resistor; a temperature-control thermocouple configured for sensing a temperature in the enclosed cavity and generate a temperature voltage signal; an amplifier coupled to the temperature-control thermocouple and configured for amplifying the temperature voltage signal to obtain an amplified temperature voltage signal; a modulator configured for converting a voltage difference between the amplified temperature voltage signal and a reference voltage signal into a digital sequence; a heating power adjustment module coupled to the modulator and configured for obtaining a heating power adjustment factor representing the voltage difference according to the digital sequence; a heating power determining module coupled to the heating power adjustment module and configured for obtaining a heating power control parameter based on the heating power adjustment factor and an initial heating power factor; and a conversion module coupled to the heating power determining module and configured for converting the heating power control parameter into a switch control signal for turning on or off the heating control switch.

According to another aspect of the present invention, the present invention provides a heating control method for a thermal convection based accelerometer including a body having an enclosed cavity and a heating control circuit configured for controllably heating the enclosed cavity. The heating control method includes: sensing a temperature in the enclosed cavity and generating a temperature voltage signal; amplifying the temperature voltage signal to obtain an amplified temperature voltage signal; calculating a voltage difference between the amplified temperature voltage signal and a reference voltage signal; converting the voltage difference into a digital sequence by using a modulator; obtaining a heating power adjustment factor representing the voltage difference based on the digital sequence; obtaining a heating power control parameter based on the heating power adjustment factor and an initial heating power factor; converting the heating power control parameter into a switch control signal; and turning on or off a heating control switch coupling with a heating resistor for heating the enclosed cavity in series according to the switch control signal.

The present invention merely adopts linear amplification but does not introduce a pole of an integrator in a closed-loop heating control circuit, so that a larger bandwidth is achieved, thereby significantly improving a stabilization speed of the closed-loop heating control circuit, and avoiding a significant increase in a chip area and power consumption simultaneously.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will be better understood with regard to the following description, appended claims, and accompanying drawings where:

DETAILED DESCRIPTION OF THE INVENTION

The detailed description of the invention is presented largely in terms of procedures, steps, logic blocks, processing, and other symbolic representations that directly or indirectly resemble the operations of communication or storage devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The present invention provides a thermal convection based accelerometer having a rapidly stabilized closed-loop heating control circuit, which can significantly improve the stabilization speed of a closed-loop heating control circuit while avoiding a significant increase in chip area and power consumption.

The thermal convection based accelerometer in the present invention includes a body having an enclosed cavity, a heating control circuit configured for controllably heating the enclosed cavity, and a plurality of detection thermocouples disposed in different positions of the enclosed cavity. An acceleration measurement value is obtained based on temperature voltage signals generated by the detection thermocouples. This specification focuses on improvement in the heating control circuit. Therefore, how to obtain the acceleration measurement value based on the temperature voltage signals generated by the detection thermocouples is not described in detail herein.

Figure 1:
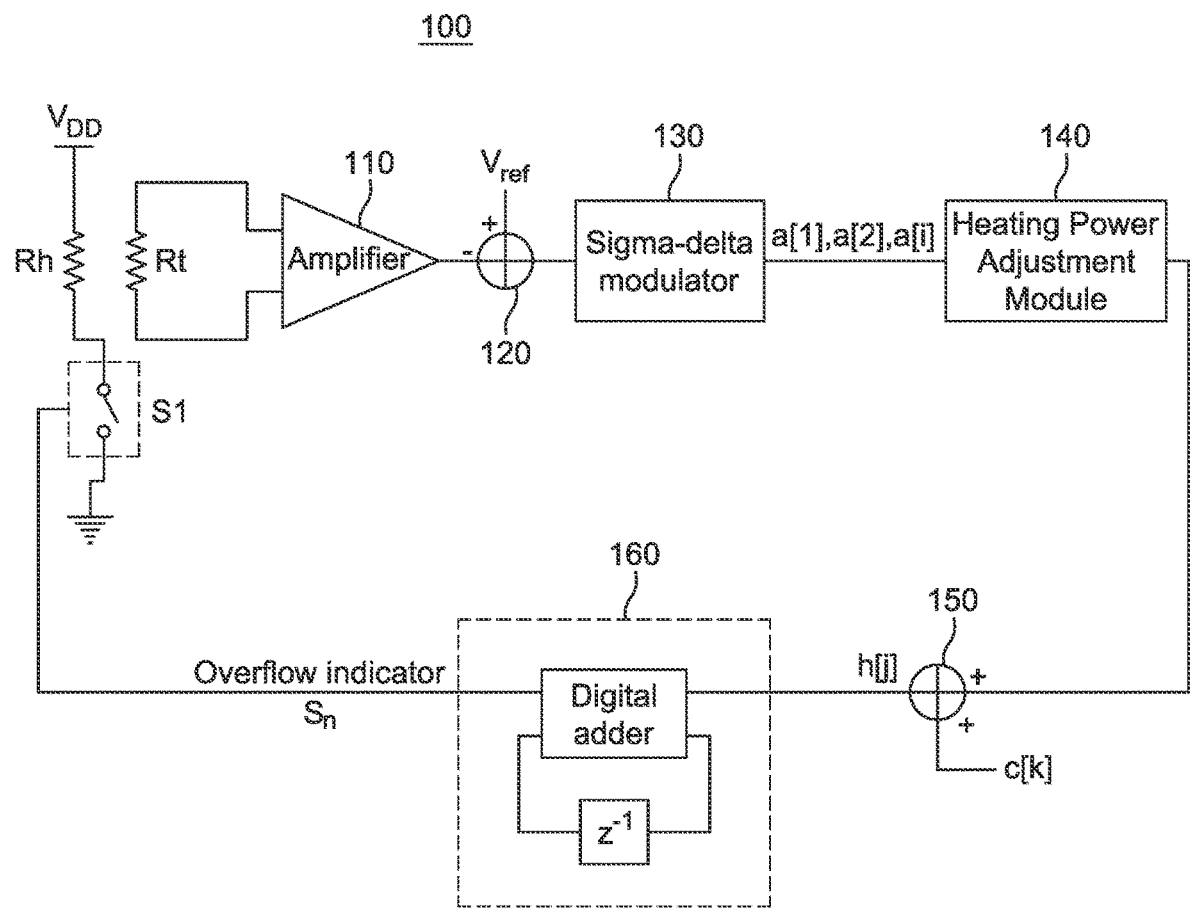
FIG. 1 is a schematic diagram showing a structural block of a heating control circuit of a thermal convection-based accelerometer according to one embodiment of the present invention.

FIG. 1 is a schematic diagram showing a structural block of the heating control circuit 100 of the thermal convection based accelerometer according to one embodiment according to the present invention. The heating control circuit 100 includes a heating resistor Rh, a heating control switch S1, a temperature-control thermocouple Rt, an amplifier 110, a voltage difference module 120, a modulator 130, a heating power adjustment module 140, a heating power determining module 150, and a conversion module 160.

The heating resistor Rh is powered on to heat the enclosed cavity (not shown). The heating resistor Rh is powered off to stop heating the enclosed cavity. The heating control switch S1 controls the heating resistor to be powered on or off. In one embodiment shown in FIG. 1, the heating resistor Rh and the heating control switch S1 are sequentially coupled in series between a power terminal VDD and a ground. In another alternative embodiment, the heating resistor Rh and the heating control switch S1 are interchangeable in their positions, namely, the heating control switch S1 and the heating resistor Rh are sequentially coupled in series between the power terminal VDD and the ground. Another connection manner can be used for the heating control switch S1 and heating resistor Rh as long as the heating control switch S1 can control the heating resistor Rh to be powered on or off. As shown in FIG. 1, a switch control signal Sn is used to turn on or off the heating control switch S1. When the switch control signal Sn is at a first logic level, for example, a high level, the heating control switch S1 is turned on, and the heating resistor Rh is powered on to heat the enclosed cavity in this case. When the switch control signal Sn is at a second logical level, for example, a low level, the heating control switch S1 is turned off, and the heating resistor Rh is powered off to stop heating the enclosed cavity in this case.

The temperature-control thermocouple Rt is configured to sense a temperature in the enclosed cavity and generate a temperature voltage signal. The amplifier 110 is coupled to the temperature-control thermocouple Rt, and configured to amplify the temperature voltage signal to obtain an amplified temperature voltage signal. The voltage difference module 120 is configured to subtract a reference voltage signal $V_{ref}$ from the amplified temperature voltage signal to obtain a voltage difference between the reference voltage signal $V_{ref}$ and the amplified temperature voltage signal. The modulator 130 is configured to convert the voltage difference into a digital sequence a[1], a[2], ..., a[i], wherein a[i] is the ith digital bit of the digital sequence. A value of each digital bit in the digital sequence is one of a first integer value and a second integer value, and a sum of the first integer value and the second integer value is 0. For example, the first integer value is 1, the second integer value is −1, and the sum of the first integer value and the second integer value is 0. Depending on a specific application requirement, the voltage difference module 120 may be disposed into the amplifier 110, or may be disposed into the modulator 130, or may be implemented independently. In one embodiment, the modulator is a sigma-delta modulator. When the voltage difference is 0, the number of −1 and the number of 1 in the digital sequence outputted by the sigma-delta modulator are identical. If the voltage difference is positive or negative, the number of −1 or 1 in the digital sequence outputted by the sigma-delta modulator will increase. The greater the value of the voltage difference is, the greater the difference between the number of 1 and −1 in the digital sequence is.

The heating power adjustment module 140 is coupled to the modulator 130, and configured to: group the digital sequence a[i] into a plurality of groups, each group including N continuous digital bits, that is, a[N*(j−1)+1], a[N*(j−1)+2], ..., a[N*j]; subsequently obtain a sum of each group of digital bits, and then multiply the obtained sum by a predetermined gain M to obtain a heating power adjustment factor. N is a natural number greater than or equal to 2, and j is the number of the groups.

In one embodiment, the heating power adjustment factor is:

$$b[j] = M * \sum_{i=N*(j-1)+1}^{N*j} a_i, \quad (1)$$

wherein M is the predetermined gain, $a_i$ is the ith digital bit in the digital sequence, b[j] is the jth heating power adjustment factor corresponding to the jth group of digital bits, and j is an integer greater than or equal to 1.

The heating power adjustment factor b[j] can represent the voltage difference, that is, a difference between the real-time temperature of the enclosed cavity and a reference temperature value of the enclosed cavity. M reflects a correction strength of the closed-loop heating control circuit 100.

In another alternative embodiment, the sum of the first integer value and the second integer value may alternatively not be 0. For example, the first integer value is 0, the second integer value is 1, and the sum of the first integer value and the second integer value is 1 in this case. In this embodiment, the heating power adjustment module 140 groups each N digital bits of the digital sequence into a group, obtains a sum of each group, then subtract N/2 from an obtained sum, and then multiply an obtained difference by the predetermined gain M to obtain the heating power adjustment factor. There may also be another alternative manner as long as the heating power adjustment module 140 can obtain the heating power adjustment factor representing the voltage difference according to the digital sequence. The heating power adjustment factor representing the voltage difference means that the value of the heating power adjustment factor can reflect the value of the voltage difference. When the voltage difference tends to 0, the heating power adjustment factor also tends to 0.

The heating power determining module 150 is coupled to the heating power adjustment module 140, and configured to obtain a heating power control parameter based on the heating power adjustment factor and an initial heating power factor. In one embodiment, the heating power control parameter is a sum of the heating power adjustment factor and the initial heating power factor. The heating power control parameter reflects a heating power of the heating resistor Rh to the enclosed cavity.

In one embodiment, the heating power control parameter is:

$$h[j]=b[j]+c[k] \quad (2)$$

wherein h[j] is the jth heating power control parameter, and c[k] is the initial heating power factor. The initial heating power factor may be a constant.

The conversion module 160 is coupled to the heating power determining module 150, and configured to convert the heating power control parameter into a switch control signal Sn that turns on or off the heating control switch S1.

In one embodiment, the conversion module is a digital integrator, which includes a digital adder and a block $Z^{-1}$, and an output D[n] of the digital integrator is expressed as:

$$D[n]=D[n-1]+h[n] \quad (3)$$

wherein n is the number of iterations and is an integer greater than or equal to 1, and h[n] is a value of the heating power control parameter in the current iteration. The switch control signal Sn is at a first logic level when the digital integrator overflows every time, and the switch control signal Sn is at a second logical level at remaining time. This means that the switch control signal Sn may indicate whether the digital integrator is overflowed, namely, the switch control signal Sn may be regarded as an overflow indicator of the digital integrator. After sufficient clock cycles, a duty ratio of the switch control signal Sn is equal to a ratio of a current value of the heating power control parameter to a full value of the heating power control parameter. The equation (3) uses h[n] instead of h[j], because there may be a plurality of times of integral operations based on the same h [j] and a plurality of times of updates of D[n] in each update cycle of h [j].

When the closed-loop heating control circuit 100 is stabilized, the amplified temperature voltage signal is controlled to be stabilized around the reference voltage signal $V_{ref}$. It indicates that the real-time temperature of the enclosed cavity is controlled to be stabilized around a reference temperature value. In this case, the voltage difference is stabilized around 0, the number of −1 and 1 in the digital sequence outputted by the sigma-delta modulator are identical substantially, the heating power adjustment factor b[j] is close to 0, the heating power control parameter remains unchanged substantially, and the duty ratio of the switch control signal Sn remains unchanged substantially.

When the closed-loop heating control circuit 100 is unstable, the voltage difference is far away from 0. In this case, the heating power adjustment factor b[j] is far away from 0, so that the heating power control parameter is increased or decreased, and a negative feedback control is realized, thereby further making the amplified temperature voltage signal close to the reference voltage signal and finally being stabilized around the reference voltage signal.

In the present invention, the heating power adjustment module 140 is a digital low-pass filter. A cut-off frequency of the low-pass filter is much higher than a cut-off frequency of the accelerometer because a sampling frequency is high. Therefore, within a bandwidth range of the accelerometer, the function of the low-pass filter is approximately linear amplification of the difference signal. In addition, the low-pass filter may be implemented by using a relatively small chip area. Different from a conventional design having an integrator, the heating control circuit of the present invention merely adopting linear amplification does not introduce a pole of the integrator, so that a lowest frequency pole P0 of the accelerometer can be used as a dominant pole of the heating control circuit, and a cut-off frequency f0 of the heating control circuit is determined by a 0 dB point of a loop gain.

Figure 2:
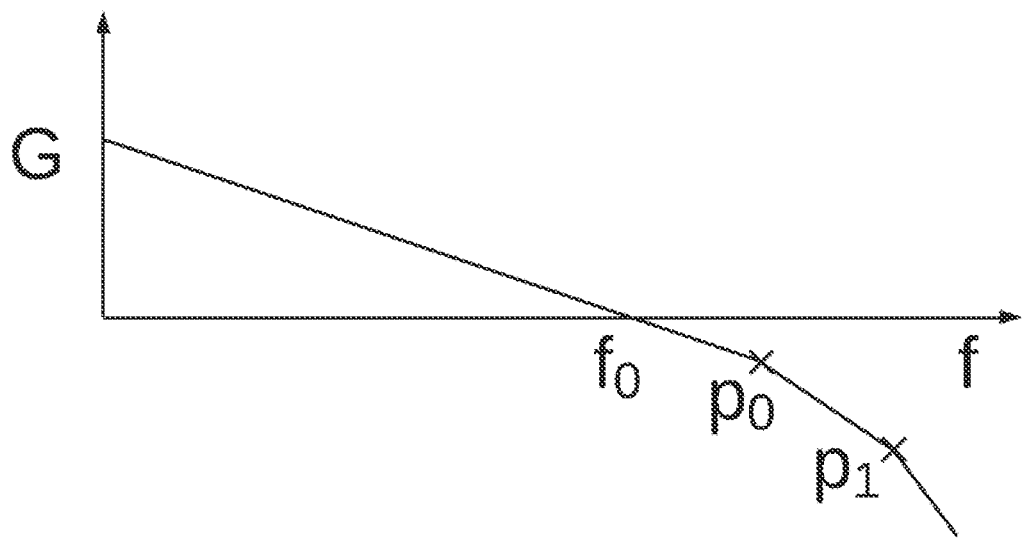
FIG. 2 shows a loop gain of a conventional heating control circuit based on an integrator.
Figure 3:
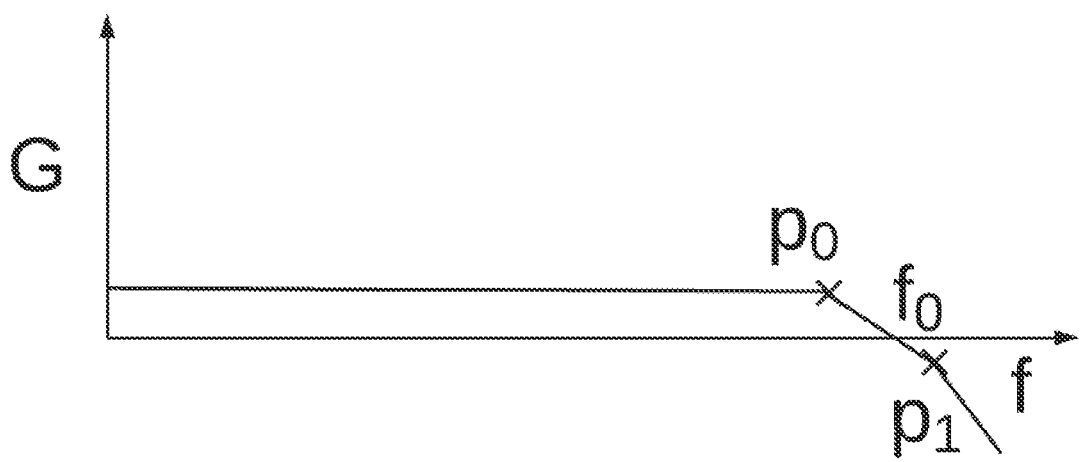
FIG. 3 shows a loop gain of a heating control circuit merely adopting linear amplification according to one embodiment of the present invention.

FIG. 2 shows a loop gain of a conventional heating control circuit based on an integrator. FIG. 3 shows a loop gain of a heating control circuit merely adopting linear amplification according to one embodiment of the present invention. It can be seen that f0 needs to be significantly lower than P0 to ensure stability shown in FIG. 2 if the heating control circuit has an integrator; but f0 is higher than P0 shown in FIG. 3 for the heating control circuit merely adopting linear amplification. Therefore, a larger bandwidth is achieved.

It can be found from FIG. 2 that the loop gain of the heating control circuit merely adopting linear amplification at DC is significantly smaller than that of the system having the integrator, which means that if c[k] remains unchanged, an error between a final value and a reference value of the temperature of the enclosed cavity greatly exceeds that of the system having an integrator. Therefore, the initial heating power factor in the present invention may alternatively be updated according to a predetermined rule.

In one embodiment, a value of c[k] needs to be updated according to the following method.

The value of c[k] is stored in a register, and when the accelerometer is enabled, the heating control circuit uses c[k] stored in the register as an initial value c0. When the accelerometer is enabled for the first time after being reset, c[0] is set to 0. When it is assumed that h[j]=$h_{target}$, a probability that 0 appears in the digital sequence is equal to a probability that 1 appears in the digital sequence when the output of the amplifier 110 reaches the reference voltage signal $V_{ref}$. Because of the existence of an error, after a sufficient long time following the accelerometer being enabled for the first time, a final value of h[j] is:

$$h_0 = \left(1 - \frac{1}{1+G}\right)h_{target}$$

c[1]=$h_0$ is set, and then it can be proved that in a next update cycle:

$$h_1 = \left(1 - \frac{1}{(1+G)^2}\right)h_{target}$$

By analogy:

$$h_n = \left(1 - \frac{1}{(1+G)^{n+1}}\right) h_{target}$$

Considering that the loop gain G is greater than 1, the value of $h_t$ is getting closer to $h_{target}$. Assuming that the loop gain G=3, after 4 iterations, a system error is less than 1%.

A final value of h[j] obtained in each measurement is stored in the register, to be used for c[k] in a next measurement. In this way, after several initial measurement cycles, the accelerometer accurately reaches a target value within a short time.

According to another aspect of the present invention, the present invention further provides a heating control method for the thermal convection based accelerometer. The heating control method includes: sensing a temperature in the enclosed cavity and generating a temperature voltage signal; amplifying the temperature voltage signal to obtain an amplified temperature voltage signal; calculating a voltage difference between the amplified temperature voltage signal and a reference voltage signal; converting the voltage difference into a digital sequence by using a modulator; obtaining a heating power adjustment factor representing the voltage difference based on the digital sequence; obtaining a heating power control parameter based on the heating power adjustment factor and an initial heating power factor; converting the heating power control parameter into a switch control signal; and turning on or off a heating control switch coupling with a heating resistor for heating the enclosed cavity in series according to the switch control signal.

In one embodiment, a value of each digital bit in the digital sequence is one of a first integer value and a second integer value, and a sum of the first integer value and the second integer value is 0. The obtaining a heating power adjustment factor based on the digital sequence comprises: obtaining a sum of each group of digital bits in the digital sequence, and then multiplying the sum by a predetermined gain to obtain the heating power adjustment factor, wherein each group comprises N digital bits and N is a natural number greater than or equal to 2. The heating power control parameter is a sum of the heating power adjustment factor and the initial heating power factor.

In one embodiment, the heating power adjustment factor is:

$$b[j] = M * \sum_{i=N*(j-1)+1}^{N*j} a_i$$

wherein M is the predetermined gain, is the ith digital bit in the digital sequence, b[j] is the jth heating power adjustment factor corresponding to the jth group, and j is an integer greater than or equal to 1.

In one embodiment, the heating power control parameter is:

$$h[j]=b[j]+c[k],$$

wherein h[j] is the jth heating power control parameter, and c[k] is the initial heating power factor.

In one embodiment, the conversion module is a digital integrator, and an output D[n] of the digital integrator is expressed as:

$$D[n]=D[n-1]+h[n],$$

wherein n is the number of iterations and is an integer greater than or equal to 1, and h[n] is a value of the heating power control parameter in the current iteration.

The switch control signal is at a first logic level when the digital integrator overflows every time, and the switch control signal is at a second logical level at remaining time. A duty ratio of the switch control signal is equal to a ratio of a current value of the heating power control parameter to a full value of the heating power control parameter.

In one embodiment, a final value of the heating power control parameter after one measurement is stored, and the stored heating power control parameter is updated as the initial heating power factor during a subsequent measurement. c[k] is the initial heating power factor updated for the kth time, an initial value of the initial heating power factor is equal to 0, and k is an integer greater than or equal to 0.

In one embodiment, the heating control switch is turned on when the switch control signal is at the first logic level, and the heating resistor is powered on to heat the enclosed cavity at this time. The heating control switch is turned off when the switch control signal is at the second logical level, and the heating resistor is powered off to stop heating at this time. The modulator is a sigma-delta modulator.

The heating control circuit of the present invention merely adopts linear amplification but does not introduce a pole of an integrator, so that a larger bandwidth is achieved, thereby significantly improving a stabilization speed of the closed-loop heating control circuit, and avoiding a significant increase in a chip area and power consumption simultaneously.

The foregoing descriptions are merely preferred embodiments of the present invention and are not intended to limit the present invention. Any modification, equivalent replacement, and improvement made without departing from the spirit and principle of the present invention shall fall within the protection scope of the present invention.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

What is claimed is:

1. A thermal convection based accelerometer, comprising:
  a body having an enclosed cavity; and
  a heating control circuit configured for controllably heating the enclosed cavity and comprising:
    a heating resistor configured for heating the enclosed cavity;
    a heating control switch configured for powering on or off the heating resistor;
    a temperature-control thermocouple configured for sensing a temperature in the enclosed cavity and generate a temperature voltage signal;
    an amplifier coupled to the temperature-control thermocouple and configured for amplifying the temperature voltage signal to obtain an amplified temperature voltage signal;
    a modulator configured for converting a voltage difference between the amplified temperature voltage signal and a reference voltage signal into a digital sequence;
    a heating power adjustment module coupled to the modulator and configured for obtaining a heating power adjustment factor representing the voltage difference according to the digital sequence;

a heating power determining module coupled to the heating power adjustment module and configured for obtaining a heating power control parameter based on the heating power adjustment factor and an initial heating power factor; and a conversion module coupled to the heating power determining module and configured for converting the heating power control parameter into a switch control signal for turning on or off the heating control switch; and wherein a value of each digital bit in the digital sequence is one of a first integer value and a second integer value, and a sum of the first integer value and the second integer value is 0;

the heating power adjustment module is configured for obtaining a sum of each group of digital bits in the digital sequence, and then multiplying the sum by a predetermined gain to obtain the heating power adjustment factor, wherein each group comprises N digital bits and N is a natural number greater than or equal to 2; and the heating power control parameter is a sum of the heating power adjustment factor and the initial heating power factor.

2. The thermal convection based accelerometer according to claim 1, wherein the heating power adjustment factor is:

$$b[j] = M * \sum_{i=N*(j-1)+1}^{N*j} a_i,$$

wherein M is the predetermined gain, $a_i$ is the ith digital bit in the digital sequence, b[j] is the jth heating power adjustment factor corresponding to the jth group of digital bits, and j is an integer greater than or equal to 1; and the heating power control parameter is:

$$h[j]=b[j]+c[k],$$

wherein h[j] is the jth heating power control parameter, and c[k] is the initial heating power factor.

3. The thermal convection based accelerometer according to claim 2, wherein the conversion module is a digital integrator, and an output D[n] of the digital integrator is expressed as:

$$D[n]=D[n-1]+h[n],$$

wherein n is the number of iterations and is an integer greater than or equal to 1, and h[n] is a value of the heating power control parameter in the current iteration;

the switch control signal is at a first logic level when the digital integrator overflows every time, and the switch control signal is at a second logical level at remaining time; and a duty ratio of the switch control signal is equal to a ratio of a current value of the heating power control parameter to a full value of the heating power control parameter.

4. The thermal convection based accelerometer according to claim 2, wherein a final value of the heating power control parameter after one measurement is stored, and the stored heating power control parameter is updated as the initial heating power factor during a subsequent measurement; and c[k] is the initial heating power factor updated for the kth time, an initial value of the initial heating power factor is equal to 0, and k is an integer greater than or equal to 0.

5. The thermal convection based accelerometer according to claim 3, wherein the heating control switch is turned on when the switch control signal is at the first logic level, and the heating resistor is powered on to heat the enclosed cavity; and the heating control switch is turned off when the switch control signal is at the second logical level, and the heating resistor is powered off to stop heating; and the modulator is a sigma-delta modulator.

6. The thermal convection based accelerometer according to claim 1, further comprising:

a plurality of detection thermocouples disposed in different positions of the enclosed cavity, wherein an acceleration measurement value is obtained based on temperature voltage signals generated by the detection thermocouples.

7. A heating control method for a thermal convection based accelerometer, comprising a body having an enclosed cavity and a heating control circuit configured for controllably heating the enclosed cavity, and the heating control method comprising:

sensing a temperature in the enclosed cavity and generating a temperature voltage signal;

amplifying the temperature voltage signal to obtain an amplified temperature voltage signal;

calculating a voltage difference between the amplified temperature voltage signal and a reference voltage signal;

converting the voltage difference into a digital sequence by using a modulator;

obtaining a heating power adjustment factor representing the voltage difference based on the digital sequence;

obtaining a heating power control parameter based on the heating power adjustment factor and an initial heating power factor;

converting the heating power control parameter into a switch control signal;

turning on or off a heating control switch coupling with a heating resistor for heating the enclosed cavity in series according to the switch control signal, wherein a value of each digital bit in the digital sequence is one of a first integer value and a second integer value, and a sum of the first integer value and the second integer value is 0;

obtaining a heating power adjustment factor based on the digital sequence comprises:

obtaining a sum of each group of digital bits in the digital sequence, and then multiplying the sum by a predetermined gain to obtain the heating power adjustment factor, wherein each group comprises N digital bits and N is a natural number greater than or equal to 2; and the heating power control parameter is a sum of the heating power adjustment factor and the initial heating power factor.

8. The heating control method according to claim 7, wherein the heating power adjustment factor is:

$$b[j] = M * \sum_{i=N*(j-1)+1}^{N*j} a_i,$$

wherein M is the predetermined gain, $a_i$ is the ith digital bit in the digital sequence, b[j] is the jth heating power adjustment factor corresponding to the jth group, and j is an integer greater than or equal to 1; and the heating power control parameter is:

$$h[j]=b[j]+c[k],$$

wherein h[j] is the jth heating power control parameter, and c[k] is the initial heating power factor.

9. The heating control method according to claim 8, wherein the heating control circuit comprises a conversion module which is a digital integrator, and an output D[n] of the digital integrator is expressed as:

$$D[n]=D[n-1]+h[n],$$

wherein n is the number of iterations and is an integer greater than or equal to 1, and h[n] is a value of the heating power control parameter in the current iteration;

the switch control signal is at a first logic level when the digital integrator overflows every time, and the switch control signal is at a second logical level at remaining time; and a duty ratio of the switch control signal is equal to a ratio of a current value of the heating power control parameter to a full value of the heating power control parameter.

10. The heating control method according to claim 8, wherein a final value of the heating power control parameter after one measurement is stored, and the stored heating power control parameter is updated as the initial heating power factor during a subsequent measurement; and c[k] is the initial heating power factor updated for the kth time, an initial value of the initial heating power factor is equal to 0, and k is an integer greater than or equal to 0.

11. The heating control method according to claim 8, wherein the heating control switch is turned on when the switch control signal is at the first logic level, and the heating resistor is powered on to heat the enclosed cavity; and the heating control switch is turned off when the switch control signal is at the second logical level, and the heating resistor is powered off to stop heating; and the modulator is a sigma-delta modulator.

* * * * *